United States Patent [19]

Schweers

[11] Patent Number: 4,693,375

[45] Date of Patent: Sep. 15, 1987

[54] PREFORM HANDLING APPARATUS

[76] Inventor: Karl D. Schweers, 22 Meridian Rd., Eatontown, N.J. 07724

[21] Appl. No.: 800,653

[22] Filed: Nov. 22, 1985

[51] Int. Cl.⁴ .......................... B07C 5/02; C03B 23/04
[52] U.S. Cl. ...................................... 209/544; 65/111; 65/158; 209/532; 209/619; 425/534
[58] Field of Search ................ 209/522, 531, 532, 540, 209/541, 544, 545, 619, 629, 707, 905; 65/29, 111, 158; 193/46, 48; 33/178 R, 178 F; 425/528, 534

[56] References Cited

U.S. PATENT DOCUMENTS

| | | | |
|---|---|---|---|
| 1,771,097 | 7/1930 | Raule | 209/619 |
| 2,596,342 | 5/1952 | McNutt et al. | 209/532 |
| 2,734,627 | 2/1956 | Shields | 209/619 X |
| 3,250,388 | 5/1966 | Eggers | 65/29 X |
| 3,378,138 | 4/1968 | Brown | 209/532 |
| 4,141,711 | 2/1979 | Zabor | 65/158 X |
| 4,255,179 | 3/1981 | Foster | 65/158 X |
| 4,349,368 | 9/1982 | Hullen et al. | 65/158 X |

FOREIGN PATENT DOCUMENTS 2706765 11/1978 Fed. Rep. of Germany ...... 209/522

0631654 8/1982 Switzerland .................. 425/534

Primary Examiner—Robert B. Reeves
Assistant Examiner—Edward M. Wacyra
Attorney, Agent, or Firm—Quaintance, Murphy & Presta

[57] ABSTRACT

There is disclosed a preform handling apparatus for orienting and testing a plurality of preforms. The preform handling apparatus of this invention comprises an orienter, an inverter and a tester. The orienter of the preform handling apparatus comprises a base driving mechanism, a rotatable circular disc carried by the base driving mechanism and a retaining wall which extends substantially around the circumference of the disc. An inverter of the present invention comprises two juxtaposed semicircular plates adapted to receive a preform in an upright position and to rotate the preform 180° such that the preform is discharged from the inverter in an inverted position. A tester of the present invention comprises a hub subassembly and a star wheel subassembly for moving preforms along an arcuate path and further comprises a gage subassembly, a cam and a bridge subassembly for detecting defective preforms and preventing defective preforms from being processed into a final product.

15 Claims, 13 Drawing Figures

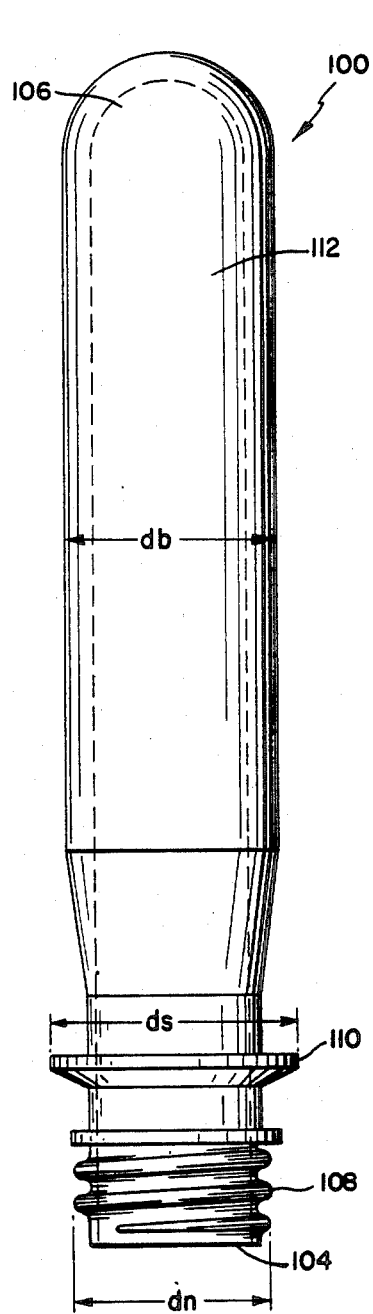
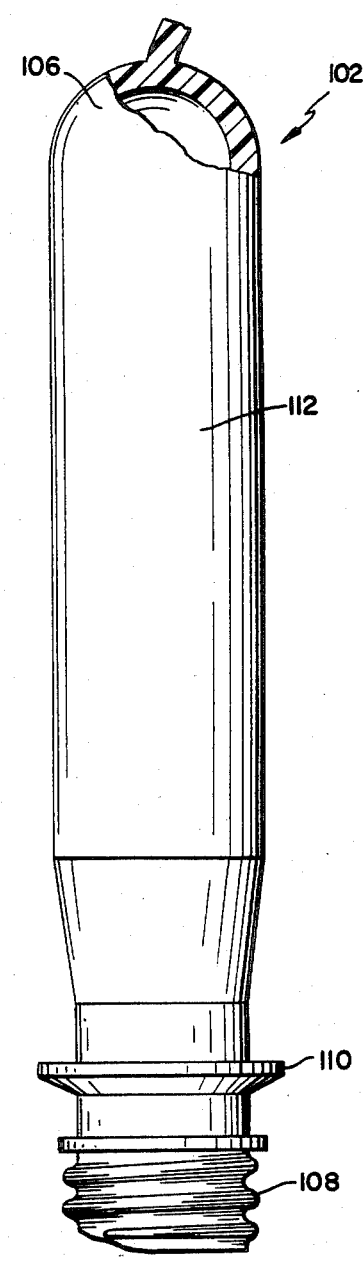
Fig. 1
Fig. 2

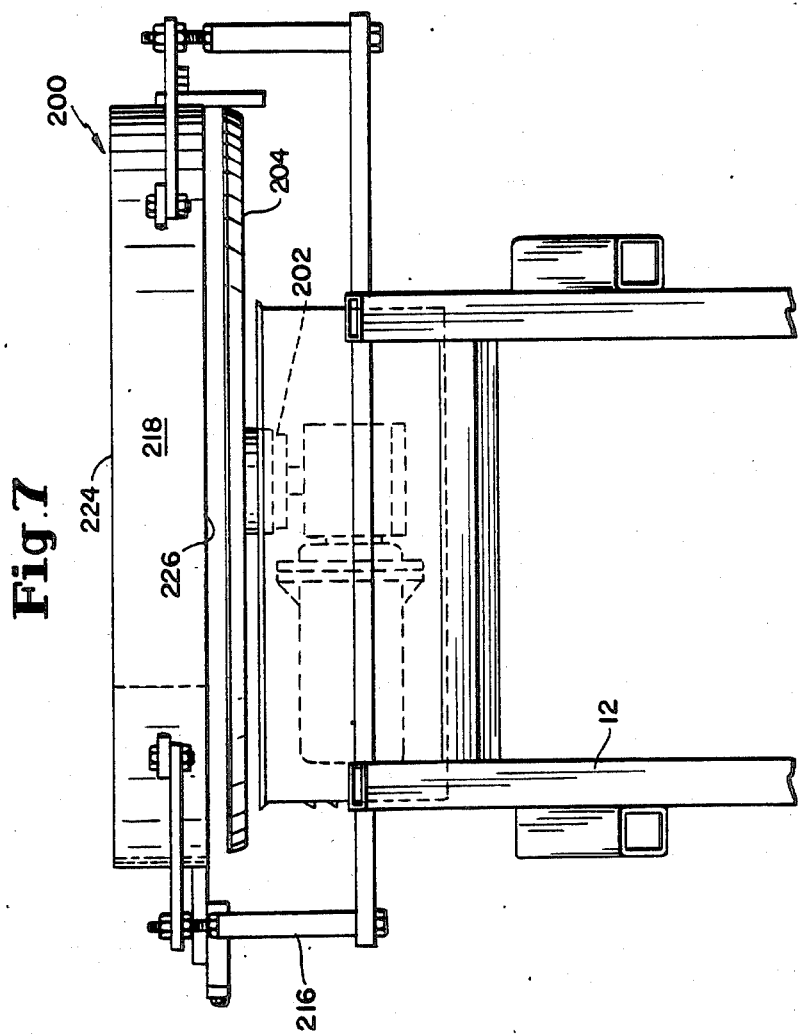

ial open end.

PREFORM HANDLING APPARATUS

BACKGROUND OF THE INVENTION

It is well known to produce thermoplastic fluid containers from thermoplastic preforms. Generally, these thermoplastic preforms are produced by injection molding. These preforms produced by injection molding generally have a rounded closed end and a cylindrical open end.

During injection molding of large quantities of preforms, it is inevitable that a number of the preforms produced will be defective. A number of different types of defects are possible. For example, if an insufficient amount of thermoplastic is injected into the mold a preform having an irregular and insufficient cylindrical open end will be formed. A preform having a defective open end due to the insufficient injection of thermoplastic material is often termed a "short shot." Another common defect occurs when too much thermoplastic material is injected and excess material is formed at the closed end of the preform.

Yet another type of defect can occur when there is insufficient cooling of a preform before it is ejected out of the mold. A preform having an irregular open end with some of the thermoplastic material pushed inwardly toward the center of the open end can result from such insufficient cooling prior to ejection.

Any fluid container manufactured from a defective preform will also be defective. Heretofore it has been common practice to manually inspect preforms or to perform no inspection of the preforms at all prior to manufacturing the preforms into fluid containers. Manual inspection of these preforms is time consuming and inexact. It is difficult by manual and visual inspection only to determine, for example, if the internal neck size of a preform is correct. Thus, previous manual inspection techniques resulted in defective preforms being manufactured into defective fluid containers. In addition, manual inspection of preforms is labor intensive and costly. However, if the preforms are not inspected prior to manufacturing the preforms into finished fluid containers, it is highly likely that many defective fluid containers will be produced.

It is therefore an object of the present invention to provide preform handling apparatus which is free of the disadvantages of known methods for orienting and testing preforms.

It is another object of the present invention to provide preform handling apparatus which automatically orients and tests a plurality of preforms for defects.

It is yet another object of the present invention to provide preform handling apparatus capable of properly aligning a plurality of randomly oriented preforms.

It is a further object of the present invention to provide a preform handling apparatus for automatically testing a plurality of preforms for a variety of defects.

It is still another object of the present invention to provide a preform handling apparatus capable of orienting and testing a plurality of preforms without the need for human intervention.

It is a still further object of the present invention to provide preform handling apparatus which automatically inverts preforms by rotating the preforms 180°.

SUMMARY OF THE INVENTION

The above and other objects are accomplished according to the present invention by providing a preform handling apparatus for orienting and testing a plurality of preforms. The preform handling apparatus of the present invention comprises an orienter, an inverter and a tester. The orienter of the preform handling apparatus comprises a base driving mechanism, a rotatable circular disc carried by the base driving mechanism and a retaining wall which extends substantially around the circumference of the disc. An inverter of the present invention comprises two juxtaposed semicircular plates adapted to receive a preform in an upright position and to rotate the preform 180° such that the preform is discharged from the inverter in an inverted position. A tester of the present invention comprises a hub subassembly and a star wheel subassembly for moving preforms along an arcuate path and further comprises a gage subassembly, a cam and a bridge subassembly for detecting defective preforms and preventing defective preforms from being processed into a final product, such as a fluid container.

DRAWINGS

The preform handling apparatus of the present invention can be further understood by reference to the drawing figures wherein:

FIG. 1 is a preform;

FIG. 2 is a defective preform;

FIG. 7 is a side view of the orienter of the preform handling apparatus taken along line 7—7 of FIG. 6;

DETAILED DESCRIPTION OF THE INVENTION

Figure 3:
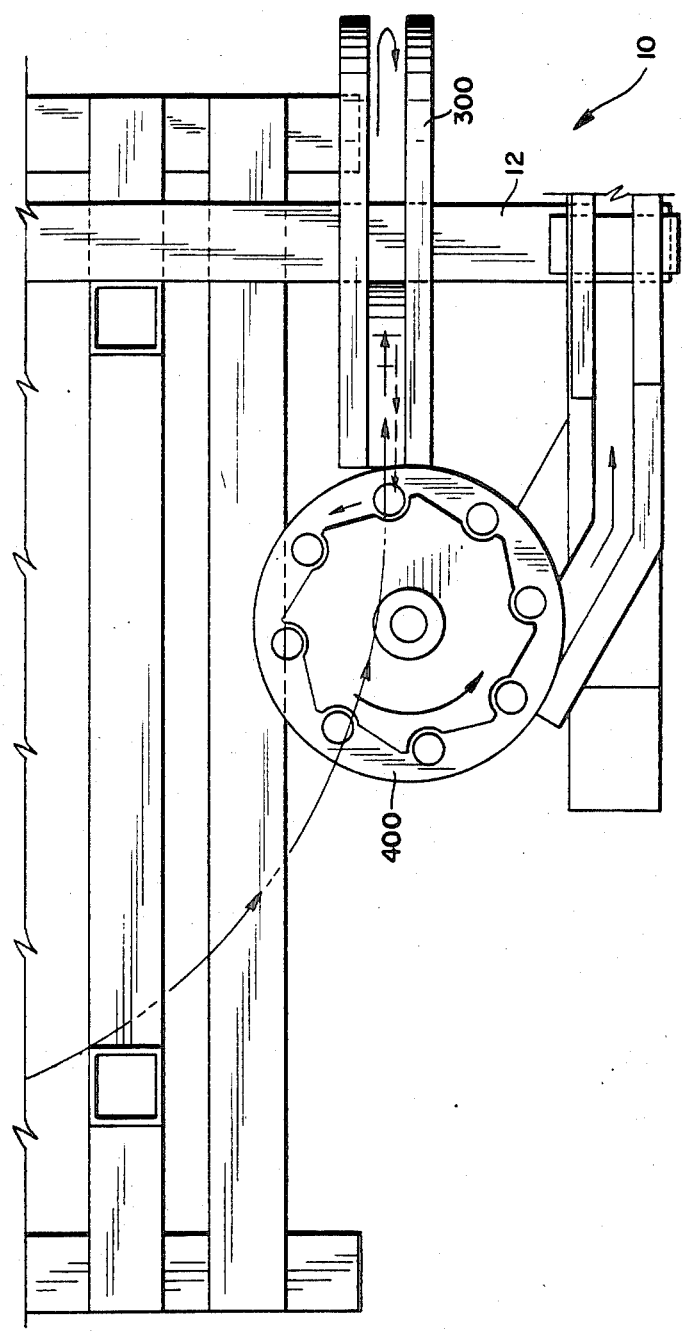
FIG. 3 is a top view of an inverter and a tester of the preform handling apparatus of the present invention.

According to the present invention there is provided a preform handling apparatus for orienting and testing preforms. A typical preform 100 is shown in FIG. 1. Preform 100 has an open end 104 and a closed end 106. The preform 100 also has a threaded neck 108 adjacent to the open end 104 and a shoulder 110 adjacent to the threaded neck 108. The body 112 of the preform 100 extends from the shoulder 110 to the closed end 106. The outer diameter ds of the shoulder 110 is greater than the outer diameter dn of the threaded neck 108 and greater than the outer diameter db of the body 112 of the preform 100. Methods for manufacturing preforms such as preform 100 are well known in the art and form no part of the present invention. Typically, a preform 100 is produced by injection molding.

During the production of preforms, it is inevitable that some preforms will have manufacturing defects. Preform 102, shown in FIG. 2, is an example of a defective preform. Preform 102 has an insufficiently formed neck 108 as well as excess material adjacent the closed end 106. Since preforms are ultimately processed into fluid containers, such as soda bottles, it is highly desirable to ensure that the preforms are free of defects. A preform such as preform 102 could not be processed into an acceptable fluid container. Any fluid container manufactured from a defective preform such as preform 102 would also be defective. In order to avoid the time and expense of producing a defective fluid container from a defective preform, it is desirable that defective preforms be identified and discarded from a group of preforms prior to processing the group of preforms into an ultimate product such as a soda bottle.

According to the present invention, there is provided a preform handling apparatus for orienting and testing a plurality of preforms. This preform handling apparatus is capable of receiving a plurality of randomly oriented preforms and then orienting the preforms in an orderly and uniform manner for transport into apparatus for processing the preforms into finished fluid containers. The preform handling apparatus of the present invention also tests the preforms for defects and prevents defective preforms from being transported to the apparatus for final processing. Thus, the preform handling apparatus of the present invention orients a plurality of preforms and tests these preforms for defects.

Figure 13:
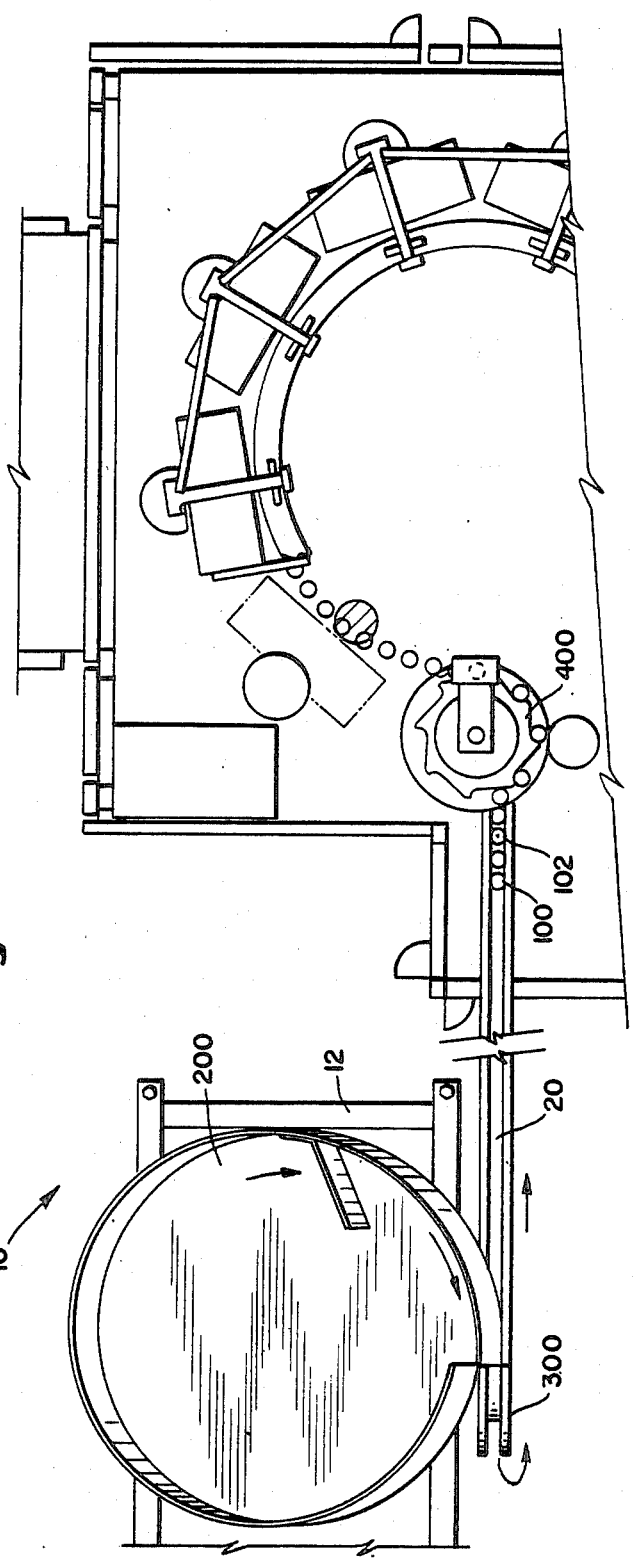
FIG. 13 is an alternate embodiment of the preform handling apparatus of the present invention.

Referring now to FIG. 13, there is shown a preform handling apparatus 10 of the present invention. Preform handling apparatus 10 comprises a frame 12, an orienter 200 carried by the frame 12, an inverter 300 carried by the frame 12 adjacent to the orienter 200, a tester 400 and a conveyor 20 between the inverter 300 and the tester 400. A preferred embodiment of the preform handling apparatus 10 is shown in FIG. 3. In this preferred embodiment, the tester 400 is carried by the frame 12 and is positioned adjacent to the inverter 300. There is no conveyor in the preferred embodiment shown in FIG. 3.

Referring now to FIGS. 4–7, it can be seen that the preform handling apparatus 10 of the present invention comprises a frame 12 and an orienter 200 carried by the frame 12. The orienter 200 comprises a base driving mechanism 202 carried by the frame 12 and a rotatable circular disc 204 carried by the base driving mechanism 202. The disc 204 has an upper surface 206 which lies in a plane 208 which is vertically displaced about 10° from horizontal. The disc 204 has an upraised portion 210 which is 10° above horizontal and a lowered portion 212 which is 10° below horizontal. The orienter 200 further comprises a plurality of wall supports 214,216 carried by the frame 12. A retaining wall 218 is carried by the wall supports 214,216. The retaining wall 218 of the orienter 200 extends substantially around the circumference of the disc 204. The retaining wall 218 has a first end 220, a second end 222, an upper edge 224 and a lower edge 226. The upper edge 224 and the lower edge 226 of the retaining wall 218 extend from the first end 220 to the second end 222. The retaining wall 218 has an inner surface 228 facing the disc 204 and an outer surface 230 facing away from the disc 204. The lower edge 226 of the retaining wall 218 is positioned at a distance from the upper surface 206 of the disc 204. The distance between the lower edge 226 of the retaining wall 218 and the upper surface 206 of the disc 204 is greater than the outer diameter db of the body 112 of a preform 100 and less than the outer diameter ds of the shoulder 110 of the preform 100.

The first end 220 and the second end 222 of the retaining wall 218 overlap such that a first end portion 232 of the outer surface 230 adjacent the first end 220 is juxtaposed at a distance from a second end portion 234 of the inner surface 228 adjacent the second end 222 of the retaining wall 218, thereby forming an orienter exit 236. The distance between the first end portion 232 and the second end portion 234 of the retaining wall 218 in the orienter exit 236 is greater than the outer diameter db of the body 112 of the preform 100 and less than the outer diameter ds of the shoulder 110 of the preform 100. The orienter exit 236 is located adjacent the upraised portion 210 of the disk 204.

In a preferred embodiment, a flexible guide 238 is carried by the retaining wall 218. The flexible guide 238 extends over the disc 204 from the inner surface 228 of the retaining wall 218.

Figure 4:
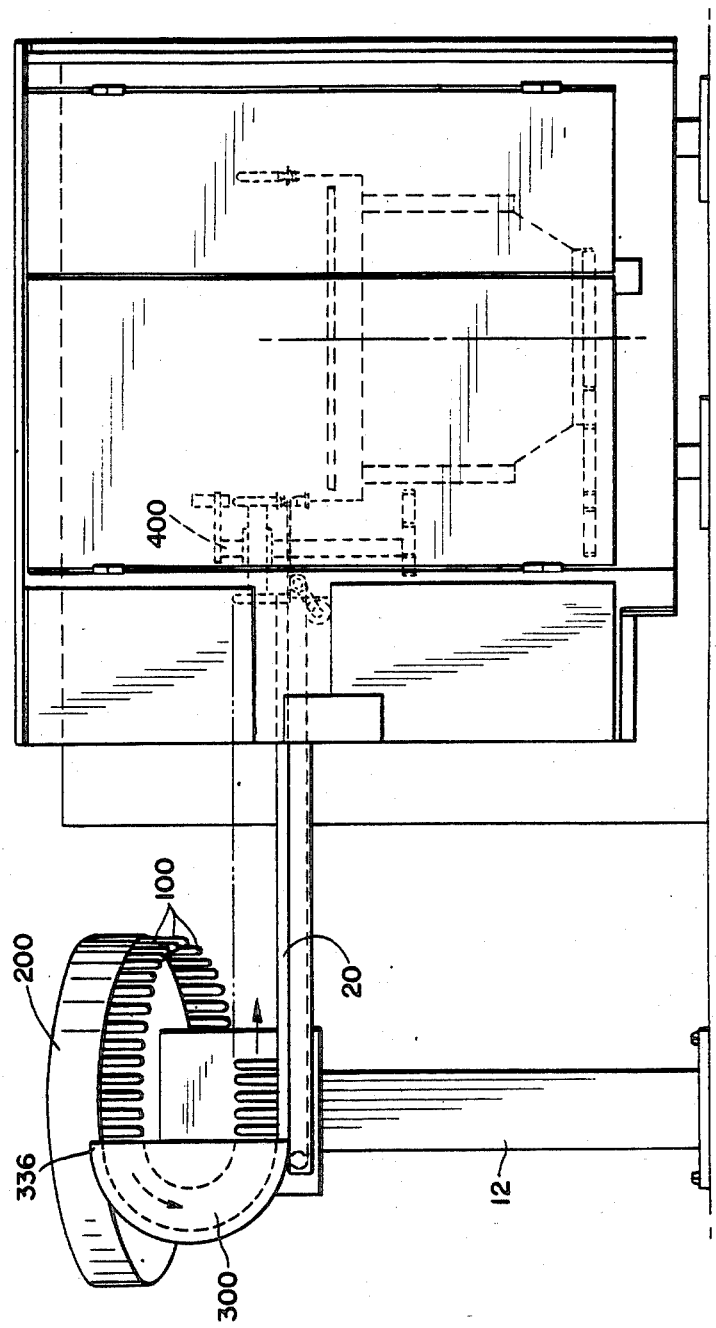
FIG. 4 is a side view of the preform handling apparatus of the present invention.
Figure 5:
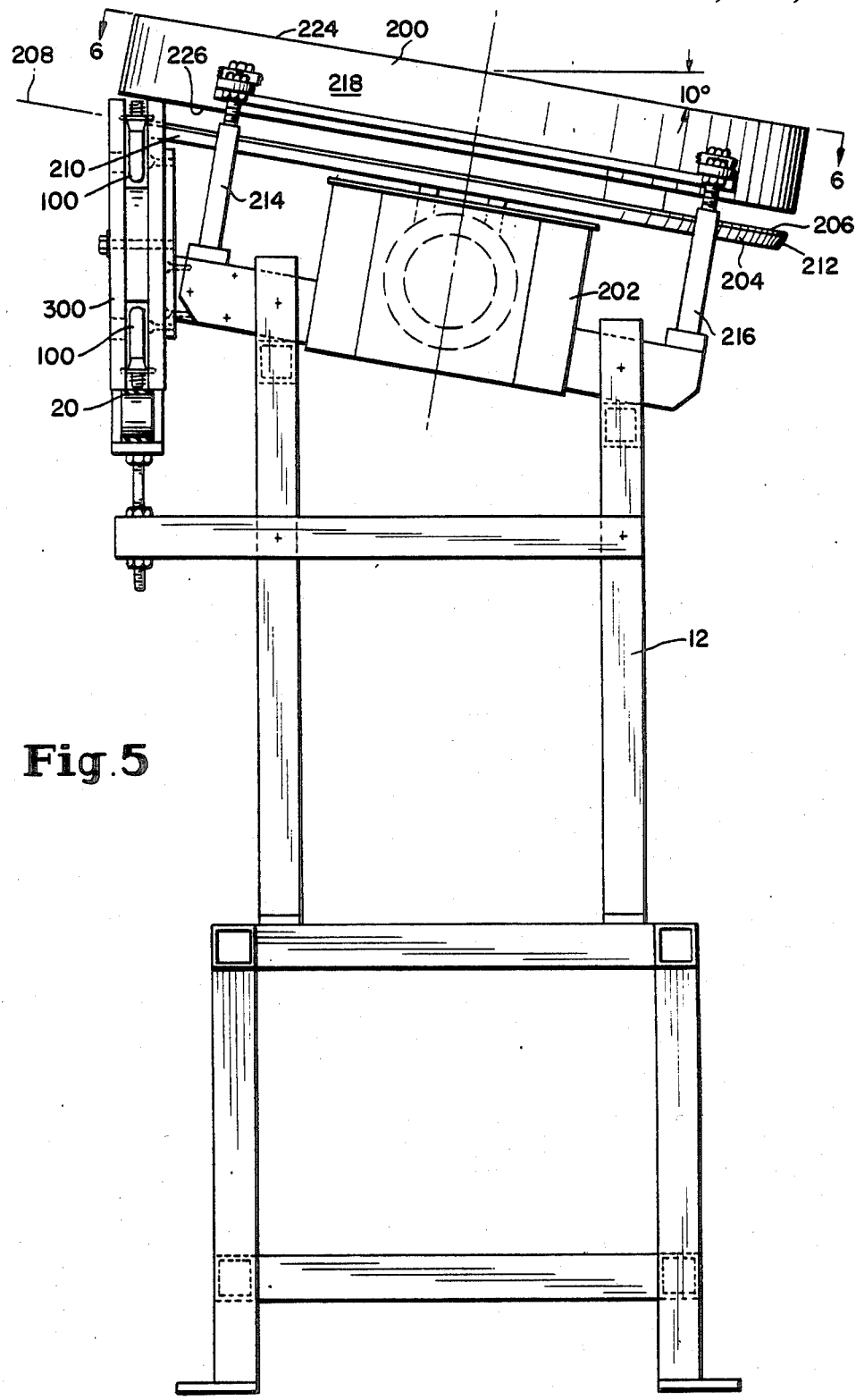
FIG. 5 is a side view of an orienter and an inverter of the preform handling apparatus.
Figure 6:
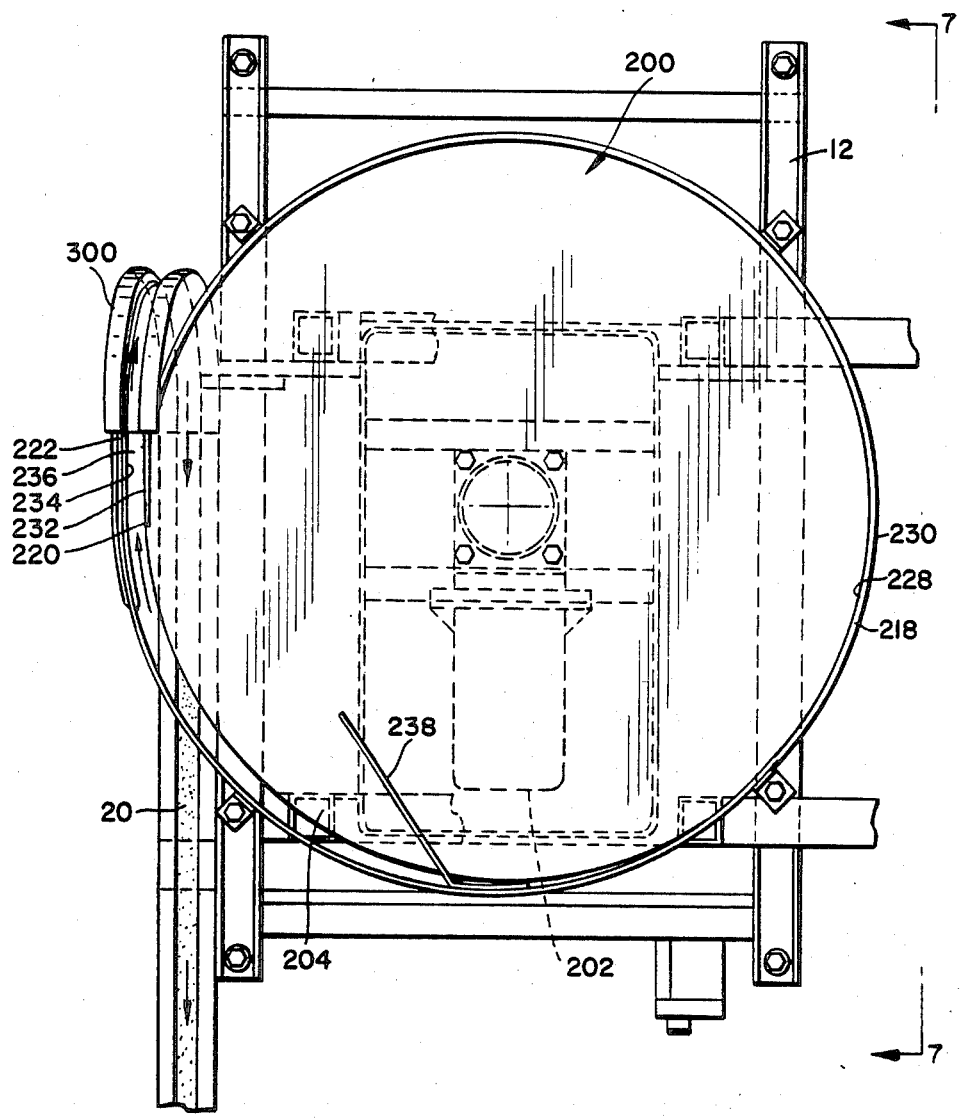
FIG. 6 is a top view of the preform handling apparatus taken along line 6—6 of FIG. 5.

As shown in FIGS. 4, 5 and 6, an inverter 300 is provided adjacent the orienter exit 236 of the orienter 200. The inverter 300 is carried by the frame 12 and is adapted to receive preforms 100, 102 from the orienter 200.

Figure 9:
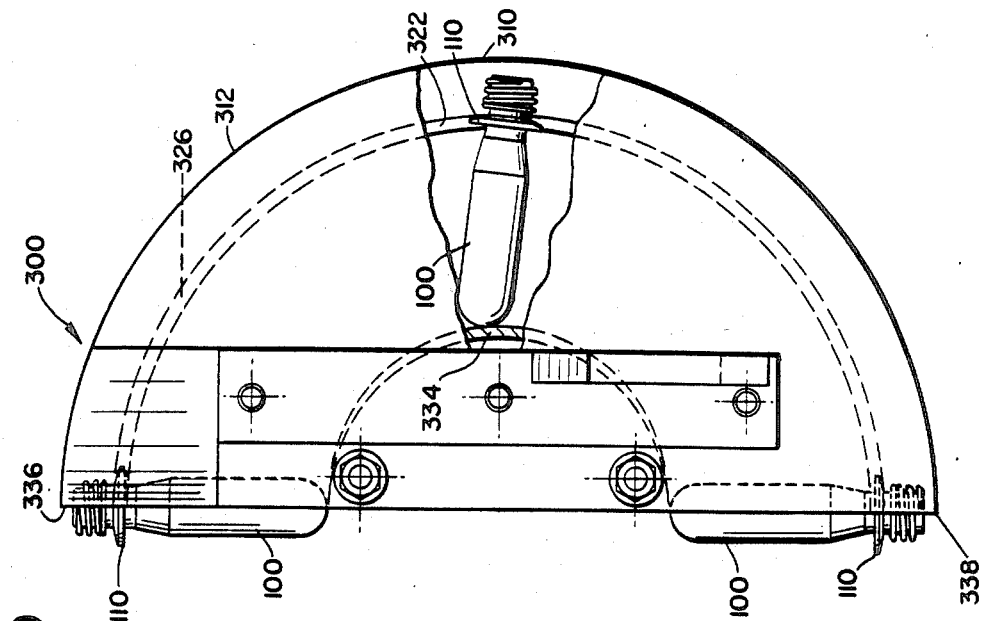
FIG. 9 is a partially cut-away side view of the inverter of the preform handling apparatus.
Figure 8:
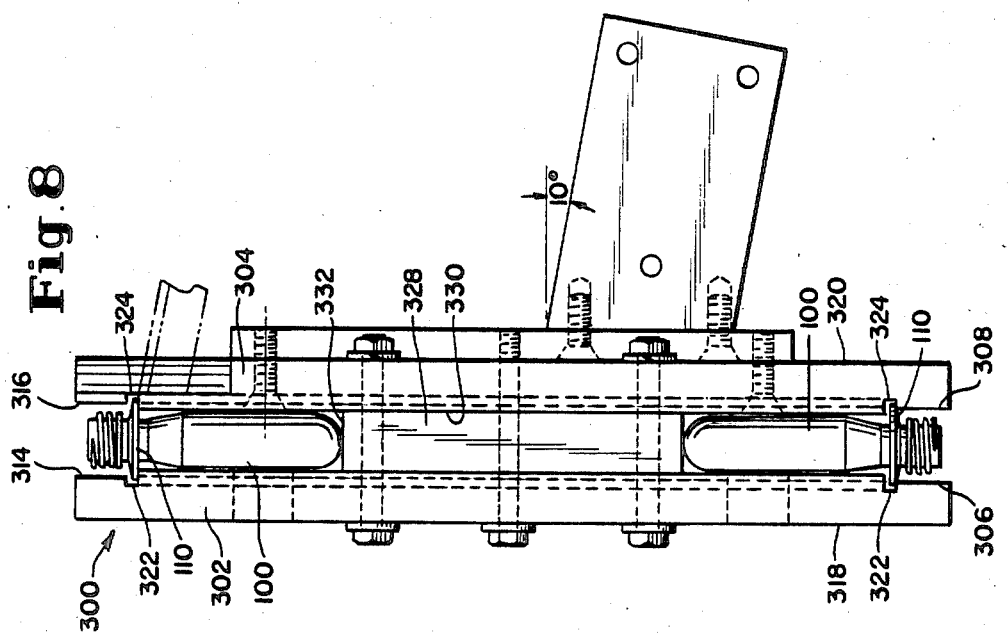
FIG. 8 is an end view of the inverter of the preform handling apparatus.

Referring now to FIGS. 8 and 9, there is shown an inverter 300 of the present invention. The inverter 300 comprises two semicircular plates 302, 304. Each of these semicircular plates 302, 304 has a straight edge 306, 308, a semicircular edge 310, 312, an inner surface 314, 316 and an outer surface 318, 320. The inner surfaces 314, 316 of the plates 302, 304 are in juxtaposed relation. The inner surface 314, 316 of each plate 302, 304 is provided with a groove 322, 324 which extends parallel to the semicircular edges 310, 312 of the plates 302 304. The grooves 322, 324 are located at a distance from the semicircular edges 310, 312 which is greater than the distance from the shoulder 110 to the open end 104 of the preform 100. The grooves 322, 324 in the plates 302, 304 are aligned to form a preform shoulder receiving passage 326.

A spacer 328 is positioned between the inner surfaces 314, 316 of the semicircular plates 302, 304. The spacer 328 maintains the plates 302, 304 in juxtaposed relation such that the distance between the inner surfaces 314, 316 of the plates 302, 304 is greater than the outer diameter db of the body 112 of the preform 100 and less than the outer diameter ds of the shoulder 110 of the preform 100. In a preferred embodiment, the spacer 328 is semicircular and has a straight edge 330 and a semicircular edge 332. The straight edge 330 of the spacer 328 is centrally disposed between the straight edges 306, 308 of the plates 302, 304. The distance from the preform shoulder receiving passage 326 to the semicircular edge 332 of the spacer 328 is greater than the distance from the shoulder 110 to the closed end 106 of the preform 100.

In a preferred embodiment of an inverter 300 of the present invention, a support rail 334 is carried by the spacer 328. The support rail 334 extends parallel to the semicircular edges 310, 312 of the plates 302, 304 and circumscribes an arc of less than 180°. Most preferably, support rail 334 is located at a distance from the preform shoulder receiving passage 326 which is slightly less than the distance from the shoulder 110 to the closed end 106 of the preform 100.

An upper end 336 of the inverter 300 is aligned with the orienter exit 236 of the orienter 200 such that the preforms 100, 102 can be fed into the inverter 300 with the shoulder 110 of the preform 100 being received in the preform shoulder receiving passage 326 with the closed end 106 of the preform 100 contacting the support rail 334 and the open end 104 of the preform 100 being directed upwardly.

The preform handling apparatus 10 of the present invention further comprises a tester 400. As shown in FIG. 13, the tester 400 can be positioned to receive preforms 100, 102 from a conveyor 20. In the embodiment shown in FIG. 13, preforms are delivered to the conveyor 20 from the inverter 300. An especially preferred embodiment of the present invention is shown in FIG. 3. In the preform handling apparatus 10, shown in FIG. 3, the tester 400 is carried by the frame 12 and the tester 400 is positioned adjacent a lower end 338 of the inverter 300. In the embodiment of the present invention shown in FIG. 3, the tester 400 receives inverted preforms 100, 102 directly from the inverter 300.

Figure 10:
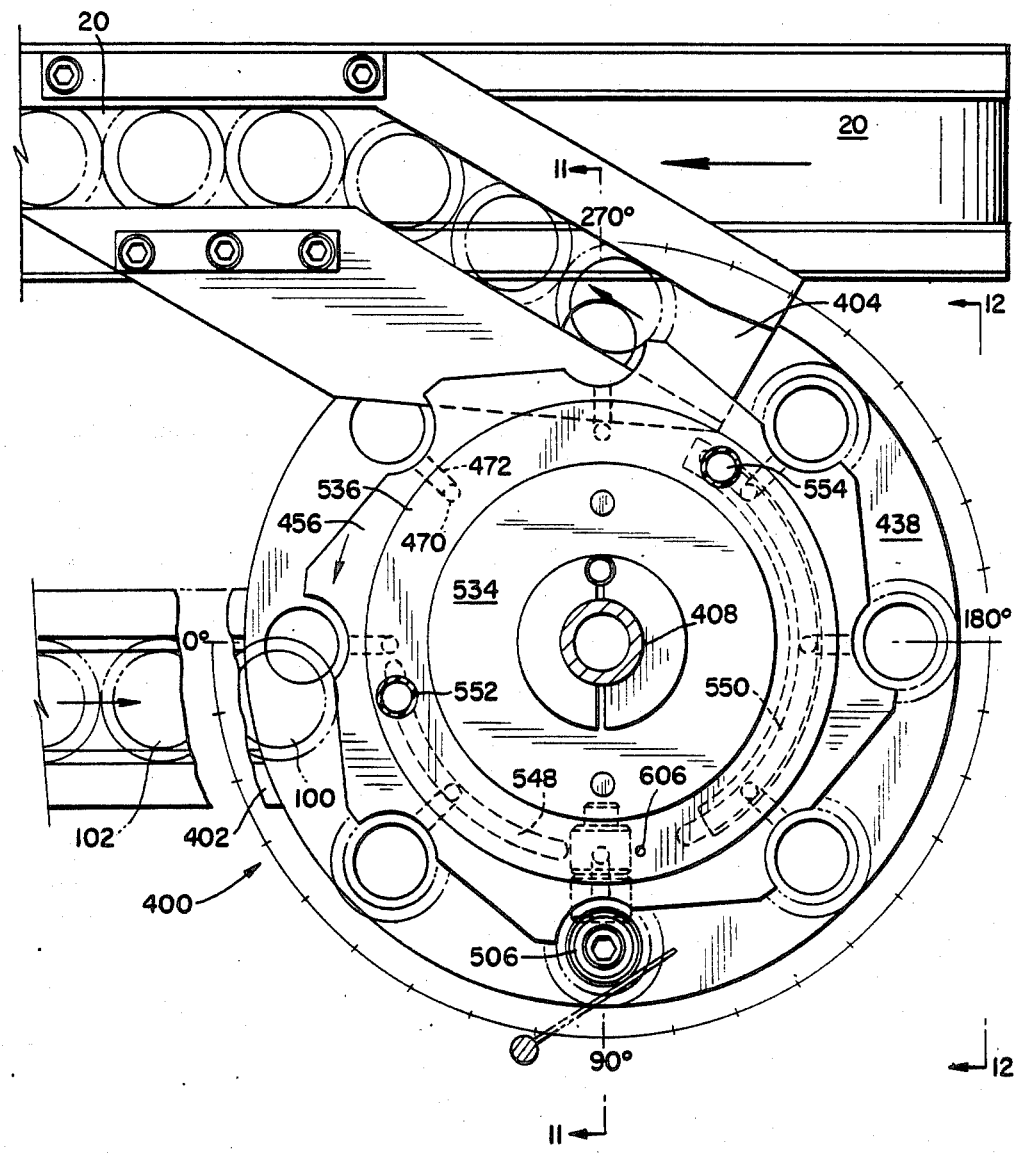
FIG. 10 is a top view of the tester of the preform handling apparatus.
Figure 11:
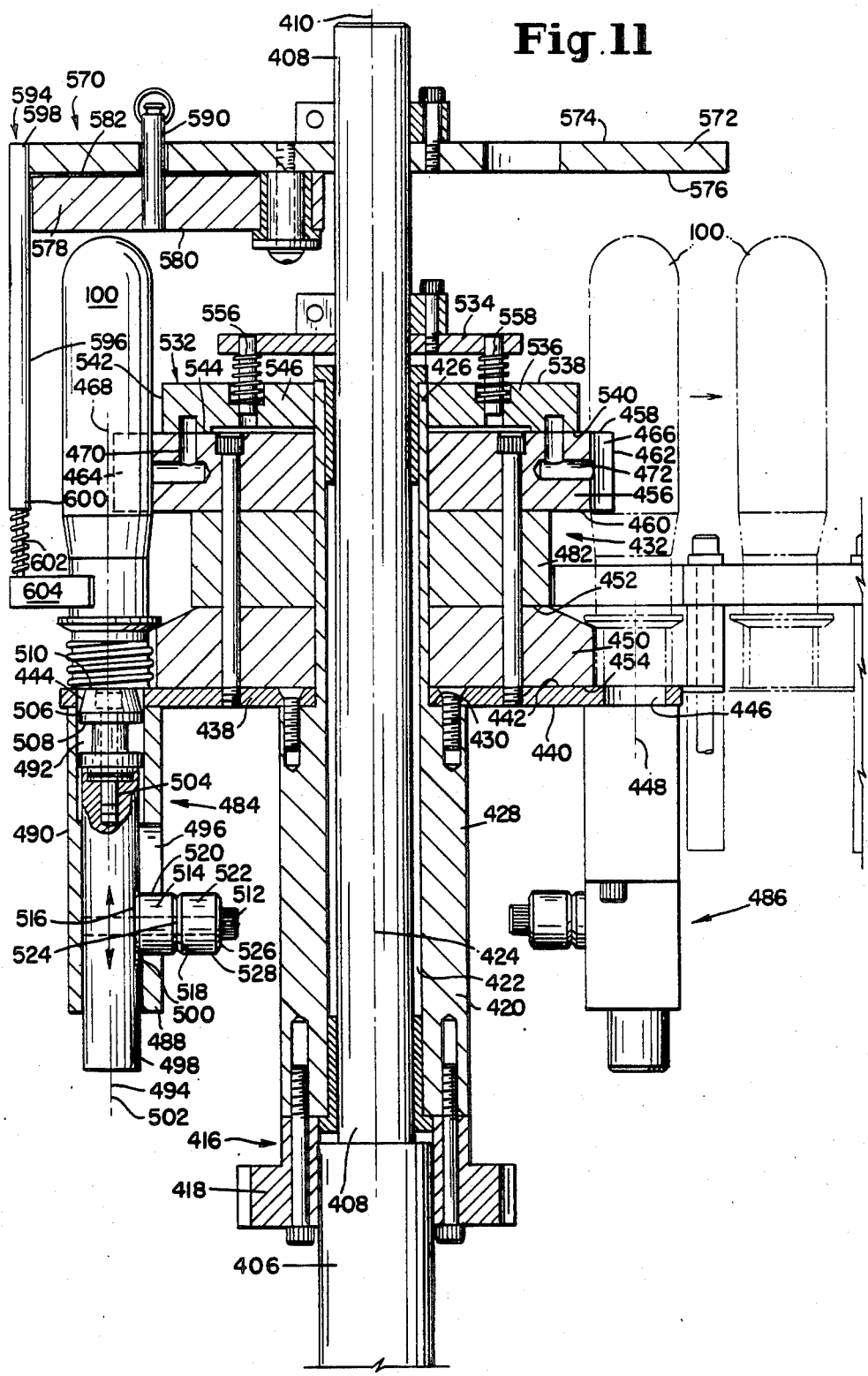
FIG. 11 is a cross-sectional view of the tester taken along line 11—11 of FIG. 10.
Figure 12:
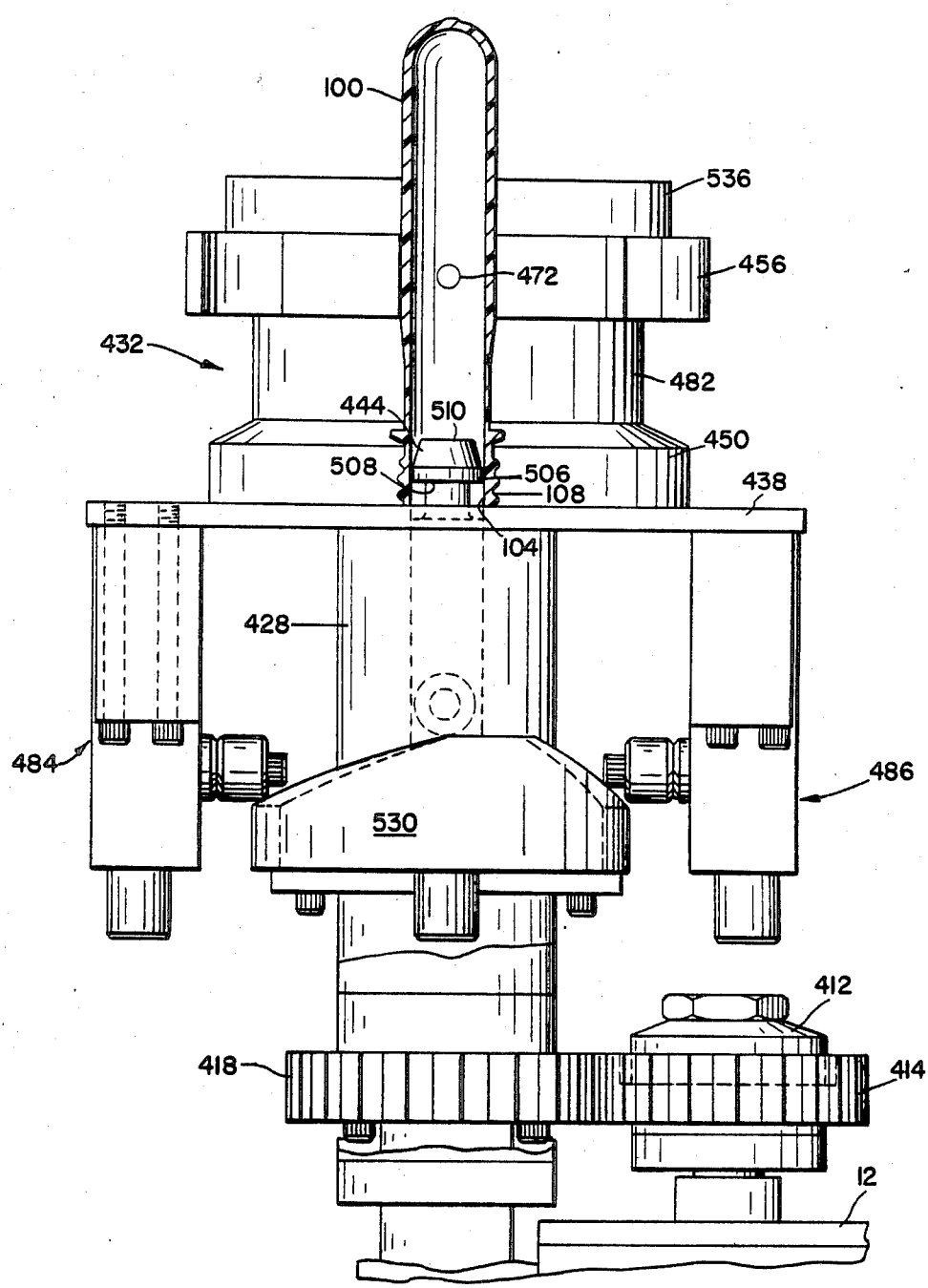
FIG. 12 is a side view of the tester taken along line 12—12 of FIG. 10.

Referring now to FIGS. 10, 11 and 12, there is shown a tester 400 of the present invention. The tester 400 has an inlet 402 for receiving inverted preforms 100, 102 and a discharge outlet 404 from which the preforms 100, 102 are guided out of the tester 400. The preforms 100, 102 move through the tester 400 in a given direction along an arcuate path of about 270°, measured from the inlet 402 to the discharge outlet 404.

The tester 400 comprises a mounting post 406 carried by the frame 12. A main shaft 408 is carried by the mounting post 406. The main shaft 408 has a vertical central axis 410. The motor 412 having a driving gear 414 is also carried by the frame 12.

The tester 400 further comprises a hub subassembly 416 carried by the mounting post 406. The hub subassembly 416 has a driven gear 418 encircling the mounting post 406. The driven gear 418 is in meshing engagement with the driving gear 414. A hub 420 is carried by the driven gear 418 and is rotatable about the main shaft 408. The hub 420 has a central passage 422 through which the main shaft 408 is received. The central passage 422 of the hub 420 has an axis 424 coincidental with the central axis 410 of the main shaft 408.

The hub 420 has an upper portion 426, a lower portion 428 adjacent the driven gear 418, and a hub shoulder 430 formed between the upper portion 426 and the lower portion 428 of the hub 420. The lower portion 428 of the hub 420 has a larger diameter than the upper portion 426.

The tester 400 also comprises a star wheel subassembly 432 which is carried by the hub 420 and is rotatable about the main shaft 408. The star wheel subassembly 432 has a central hub-receiving passage 434 therethrough with an axis 436 coincidental with the axis 424 of the central passage 422 of the hub 420. The star wheel subassembly 432 has a base plate 438, a lower star wheel 450, an upper star wheel 456 and a star wheel spacer 482.

The base plate 438 of the star wheel subassembly 432 has a lower surface 440 and an upper surface 442. Preferably, the lower surface 440 of the base plate 438 is adjacent the hub shoulder 430. The base plate 438 has a plurality of gage receiving passages 444, 446 therethrough. The gage receiving passages 444, 446 are radially evenly spaced on a given circle, which circle has its center on the axis 436 of the star wheel subassembly 432. Each of the gage receiving passages 444, 446 has a substantially circular cross-section. The diameter of the cross-section of the gage receiving passages 444, 446 is larger than the internal diameter of the open end 104 of the preform 100 and smaller than the outer diameter dn of the neck 108 of the preform 100. Each of the gage receiving passages 444, 446 has a central gage passage axis 448.

The lower star wheel 450 has an upper surface 452 and a lower surface 454. The lower surface 454 of the lower star wheel 450 is adjacent to the upper surface 442 of the base plate 438.

The upper star wheel 456 is juxtaposed from the lower star wheel 450. The upper star wheel 456 has an upper surface 458, a lower surface 460 and an outer edge 462. The outer edge 462 is provided with a plurality of preform engaging surfaces 464, 466. The number of preform engaging surfaces 464, 466 is equal to the number of gage receiving passages 444, 446 in the base plate 438. Each of the preform engaging surfaces 464, 466 is curved about a curve axis 468 which is coincidental with the axis 448 of one of the gage receiving passages 444, 446. Each of the preform engaging surfaces 464, 466 is located above one of the gage receiving passages 444, 446. Thus, for any given preform engaging surface 464, the preform engaging surface 464 is curved about a curve axis 468 which is coincidental with the central gage passage axis 448 of the corresponding gage receiving passage 444.

The upper star wheel 456 is further provided with a plurality of vacuum passages 470, 472. Each of the vacuum passages 470, 472 has a first opening 474 in the upper surface 458 of the upper star wheel 456 and a second opening 476 in one of the preform engaging surfaces 464, 466. The number of vacuum passages 470, 472 is equal to the number of preform engaging surfaces 464, 466. Each of the vacuum passages 470, 472 is associated with one of the preform engaging surfaces 464, 466. Each preform engaging surface 464, 466 has one and only one vacuum passage 470, 472 associated therewith.

A star wheel spacer 482 is positioned between the upper star wheel 456 and the lower star wheel 450. The star wheel spacer 482 is adjacent the lower surface 460 of the upper star wheel 456 and adjacent upper surface 452 of the lower star wheel 450.

The tester 400 also comprises a plurality of gage subassemblies 484, 486 which are fixedly attached to the lower surface 440 of the base plate 438. The gage subassemblies 484, 486 extend downwardly from the lower surface 440 of the base plate 438 such that each of the gage subassemblies 484, 486 is aligned with one of the gage receiving passages 444, 446 in the base plate 438. Each of the gage subassemblies 484, 486 comprises a gage housing 488, a gage shaft 498, a gage pin 504, a gage 506, a cam shaft 512, a roller 514 and a cam follower 522.

The gage housing 488 has a cylindrical wall 490 and a central passage 492 therethrough with an axis 494. The axis 494 of the gage housing 488 is coincidental with the central gage passage axis 448 of the gage receiving passage 444 with which the gage subassembly 484 is aligned. The gage housing 488 has an inner diameter equal to the diameter of the gage receiving passage 444 in the base plate 438. The gage housing 488 has a roller receiving passage 496 formed in the cylindrical wall 490.

A gage shaft 498 is slidably received in the central passage 492 of the gage housing 488. The gage shaft 498 has a roller receiving recess 500 formed therein. The gage shaft 498 has a central axis 502 which is coincidental with the axis 494 of the gage housing 488. A gage pin 504 is carried by the gage shaft 498. A gage 506 is carried by the gage pin 504. The gage 506 is frusto-conical, with a larger diameter lower end face 508 and a smaller diameter upper end face 510. The diameter of the lower end face 508 of the gage 506 is smaller than the diameter of the gage receiving passage 444 in the base plate 438.

A cam shaft 512 is fixedly secured at one end to the gage shaft 498. The cam shaft 512 extends through the roller receiving recess 500 and the roller receiving passage 496 and is perpendicular to the gage shaft 498. A roller 514 is rotatably mounted on the cam shaft 512. The roller 514 has a first end 516, a second end 518 and a sidewall 520 therebetween. The first end 516 of the roller 514 is positioned in the roller receiving recess 500 of the gage shaft 498. The sidewall 520 of the roller 514 contacts the roller receiving passage 496 in the gage housing 488. A cam follower 522 is also rotatably mounted on the cam shaft 512. The cam follower 522 has a first end 524, a second end 526 and a sidewall 528 therebetween. The first end 524 of the cam follower 522 is adjacent the second end 518 of the roller 514.

The tester 400 further comprises a cam 530. The cam 530 is carried by the mounting post 406 and is located below the star wheel subassembly 432. The cam 530 is adapted to successively contact the sidewall 528 of each cam follower 522 as the star wheel subassembly 432 and the gage subassemblies 484, 486 secured thereto rotate about the main shaft 408. Preferably, the cam 530 extends below the star wheel subassembly 432 from about 120° to 210° along the path of movement of the preforms 100, 102 through the tester 400.

As the star wheel subassembly 432 rotates about the main shaft 408, each cam follower 522 successively contacts the cam 530. As the cam follower 522 contacts the cam 530, the gage shaft 498 secured to the cam shaft 512 upon which the cam follower 522 is mounted moves upwardly toward the base plate 438. As the gage shaft 498 moves upwardly toward the base plate 438, the gage 506 passes through the gage receiving passage 444 in the base plate 438 such that the lower end face 508 of the gage 506 is raised above the upper surface 442 of the base plate 438. As the cam follower 522 continues passing over the cam 530, the gage shaft 498 moves in a downward direction and the gage 506 returns to a position wherein the upper end face 510 of the gage 506 is aligned with upper surface 442 of the base plate 438.

The tester 400 further comprises a vacuum subassembly 532. The vacuum subassembly 532 is carried by the main shaft 408 above the star wheel subassembly 432. The vacuum subassembly 532 comprises a retainer disc 534 fixedly secured to the main shaft 408 and a vacuum disc 536 juxtaposed with the retainer disc 534 and fixedly mounted on the hub 420.

The vacuum disc 536 has an upper surface 538 facing the retainer disc 534, a lower surface 540 and an outer edge 542 therebetween. The lower surface 540 of the vacuum disc 536 has an edge portion 544 adjacent the outer edge 542. This edge portion 544 has a thickness greater than the thickness of a center portion 546 of the lower surface 540 of the vacuum disc 536. The edge portion 544 of the vacuum disc 536 is in contact with the upper surface 458 of the upper star wheel 456. The edge portion 544 of the vacuum disk 536 has two vacuum channels 548, 550 formed therein. A first vacuum channel 548 is aligned in fluid communication with the first opening 474 of the vacuum passages 470, 472 in the upper star wheel 456 from the inlet 402 of the tester 400 to about 70° along the arcuate path of movement. The second vacuum channel 550 is aligned in fluid communication with the first opening 474 of the vacuum passages 470, 472 in the upper star wheel 456 from about 110° to 250° along the arcuate path. The vacuum disc 536 has two vacuum line receiving passages 552, 554 in the upper surface 538 thereof. One of the vacuum line receiving passages 552 is in fluid communication with the first vacuum channel 548 and the other of the vacuum line receiving passages 554 is in fluid communication with the second vacuum channel 550. The vacuum disc 536 is further provided with an air bleeder 606. The air bleeder 606 is positioned between the first vacuum channel 548 and the second vacuum channel 550. The air bleeder 606 extends from the upper surface 538 of the vacuum disc 536 to the lower surface 540 of the vacuum disc 536. The air bleeder 606 has a first opening in the upper surface 538 of the vacuum disc 536 and a second opening in the lower surface 540 of the vacuum disc 536. The vacuum subassembly 532 further comprises a plurality of springs 556, 558. Each of these springs 556, 558 has a first end 560 secured to the retainer disc 534 and a second end 562 secured to the vacuum disc 536.

According to the present invention, vacuum lines are received in the vacuum line receiving passages 552, 554 in the upper surface 538 of the vacuum disc 536 thereby creating a vacuum through the first vacuum channel 548 and the second vacuum channel 550. This produces two vacuum-on areas 564, 566 in the tester 400. The first vacuum-on area 564 extends from the inlet 402 to about 70° along the arcuate path. The second vacuum-on area 566 extends from about 110° to about 250° along the arcuate path. A vacuum-off area 568 of the arcuate path extends from about 70° to about 110°. This vacuum-off area 568 is the area between the first vacuum channel 548 and the second vacuum channel 550. The air bleeder 606 is positioned within the vacuum-off area 568.

The tester 400 further comprises a bridge subassembly 570 which is carried by the main shaft 408 above the vacuum subassembly 532. The bridge subassembly 570 has a top plate 572 which encircles the main shaft 408 and is fixedly secured thereto. The top plate 572 has an upper surface 574 and a lower surface 576.

A first testing bridge 578 is carried by the top plate 572. The first testing bridge 578 has a lower edge 580 and an upper edge 582. The first testing bridge 578 extends radially along the lower surface 576 of the top plate 572 such that the upper edge 582 of the first testing bridge 578 is adjacent the lower surface 576 of the top plate 572. The first testing bridge 578 extends over the vacuum subassembly 532 such that the first testing bridge 578 is located above the vacuum-off area 568 of the arcuate path.

A second testing bridge 584 is also carried by the top plate 572. The second testing bridge 584 has a lower edge 586 and an upper edge 588. The second testing bridge 584 extends radially along the lower surface 576 of the top plate 572 such that the upper edge 588 of the second testing bridge 584 is adjacent the lower surface 576 of the top plate 572. The second testing bridge 584 extends over the star wheel subassembly 432 such that the second testing bridge 584 is above the cam 530. For completeness, the second testing bridge 584 is shown in FIG. 11. It is preferable, however, that the second testing bridge 584 be positioned 50° to 130°, measured in the direction of travel along the arcuate path, from the first testing bridge 578.

The first testing bridge 578 and the second testing bridge 584 are fixedly secured to the top plate 572 by any suitable means. Bridge springs 590,592 constitute one such securing means. Other means for fixedly securing the first testing bridge 578 and the second testing bridge 584 to the top plate 572 could include screws, pins and other mechanical fasteners.

The distance from the lower edge 580 of the first testing bridge 578 to the upper surface 442 of the base plate 438 is slightly greater than the distance from the open end 104 to the closed end 106 of the preform 100. The distance from the lower edge 586 of the second testing bridge 584 to the upper surface 442 of the base plate 438 is slightly greater than the distance from the open end 104 to the closed end 106 of the preform 100.

A spring retainer subassembly 594 is carried by the top plate 572 of the bridge subassembly 570 of the tester 400. The spring retainer subassembly 594 comprises a post 596, a spring retainer 602 and a spring retainer blade 604. The post 596 has an upper end 598 and a lower end 600. The upper end 598 of the post 596 is fixedly secured to the top plate 572 such that the post 596 extends downwardly from the lower surface 576 of the top plate 572. The spring retainer 602 is attached to the lower end 600 of the post 596. The spring retainer blade 604 is attached at one end to the spring retainer 602. The spring retainer blade 604 extends perpendicular to the post 596. The spring retainer blade 604 extends substantially tangentially to the arcuate path within the vacuum-off area 568 of the arcuate path through the tester 400.

In operation the preform handling apparatus 10 of the present invention functions as follows.

A plurality of preforms 100, 102 are placed on the circular disc 204 of the orienter 200. Although many of these preforms will be properly formed such as preform 100, some of these preforms may be defective such as preform 102.

The circular disc 204, upon which the preforms 100, 102 have been placed, is caused to rotate by the base driving mechanism 202. As the disc 204 rotates, the preforms 100, 102 migrate towards the retaining wall 218 and become oriented such that the body 112 of the preform 100 extends beyond the disc 204 and the outer surface 230 of the retaining wall 218. The shoulder 110 and threaded neck 108 of the preform 100 are held adjacent to the inner surface 228 of the retaining wall 218 and the upper surface 206 of the disc 204. The preforms 100, 102 will be hanging below the disc 204 and the retaining wall 218 as shown in FIG. 4. Although the preforms 100,102 shown in FIG. 4 all appear to extend vertically below the retaining wall 218, in actual operation those preforms 100,102 remotest from the orienter exit 236 will extend from the orienter 200 at an angle between vertical and horizontal. The preforms 100,102 become increasingly angled toward vertical as they approach the orienter exit 236 and are vertically aligned prior to entering the orienter exit 236. These preforms 100, 102 which are oriented with the body 112 extending beyond the disc 204 and the outer surface 223 of the retaining wall 218 will pass under the flexible guide 238 and proceed into the orienter exit 236. The flexible guide 238 will contact any preform 100, 102 which is located entirely on the disc 204 and divert these preforms 100, 102 away from the orienter exit 236. The flexible guide 238 directs the preforms 100, 102 toward the retaining wall 218 so that these preforms 100, 102 can become properly oriented.

Preforms 100, 102 which extend beyond the disc 204 and the retaining wall 218 are fed into the inverter 300 such that the shoulder 110 of the preform 100 is received in the preform shoulder receiving passage 326. The open end 104 of the preform 100 will be directed upwardly, that is toward the semicircular edges 310, 312 of the semicircular plates 302, 304. In a preferred embodiment of the present invention, the closed end 106 of the preform 100 will contact the support rail 334.

The preform 100 then falls through the inverter 300 with the shoulder 110 of the preform 100 traveling through the preform shoulder receiving passage 326. The closed end 106 of the preform 100 preferably maintains contact with the support rail 334 throughout the duration of the travel of the preform 100 through the inverter 300. The preform 100 exits from the inverter 300 at a lower end 338 of the inverter 300. The lower end 338 of the inverter 300 is diametrically opposite and below the orienter exit 236 and the upper end 336 of the inverter 300. Upon arrival at the lower end 338 of the inverter 300, the preform 100 will have been rotated 180° such that the preform 100 exits from the lower end 338 of the inverter 300 with the open end 104 of the preform 100 directed downwardly.

Upon exiting from the lower end 338 of the inverter 300, the preform 100 proceeds into the tester 400. The preform 100 can be deposited onto a conveyor 20 from the inverter 300 and subsequently guided into the tester 400 from the conveyor 20. However, it is preferable that the preform 100 be fed directly into the tester 400 from the lower end 338 of the inverter 300.

The preforms 100, 102 enter the tester 400 at the inlet 402. The preforms 100, 102 enter the tester 400 through the inlet 402 in an inverted position, such that the open end 104 of the preforms 100, 102 comes into contact with the upper surface 442 of the base plate 438 of the star wheel subassembly 432. As the preforms 100, 102 successively enter the tester 400, each preform 100, 102 is "picked-off" by the star wheel subassembly 432 such that one of the preform engaging surfaces 464, 466 of the upper star wheel 456 comes into contact with the body 112 of the preform 100, 102. Since the area from about 0° to about 70° along the arcuate path of movement through the tester 400 is the first vacuum-on area 564, the preform 100, 102 is maintained in contact with the preform engaging surface 464, 466 by vacuum. The preform 100, 102 travels through the first vacuum-on area 564 which extends from the inlet 402 to about 70° along the arcuate path. The preform 100, 102 then proceeds into the vacuum-off area 568 of the arcuate path. In the vacuum-off area 568 there is no vacuum exerted upon the preform 100, 102. In this vacuum-off area 568 there is no vacuum available to assist in maintaining the preform 100, 102 in an inverted, balanced position. Thus, if the open end 104 of the preform 100, 102 is defective, that is, irregular or unevenly shaped, the preform 100, 102 will be unable to maintain its balance and a defective preform, such as preform 102, will fall out of the tester. While passing through the vacuum-off area 568, the preform 100, 102 will pass below the first testing bridge 578. If the preform 100, 102 is overly long or has additional, undesirable material adjacent the closed end 106, the first testing bridge 578 will come into contact with the closed end 106 or extraneous material adjacent the closed end 106 and will knock the preform 100, 102 out of the tester 400.

After passing through the vacuum-off area 568, the preform 100, 102 proceeds into the second vacuum-on area 566. The second vacuum-on area 566 extends from about 110° to about 250° along the arcuate path through the tester 400. As the preform 100, 102 passes through the second vacuum-on area 566, the sidewall 528 of the cam follower 522 of the gage subassembly 484 located below the gage receiving passage 444 over which the preform 100, 102 is positioned, comes into contact with the cam 530. As the cam follower 522 begins moving over the surface of the cam 530, the gage shaft 498 secured to the cam shaft 512 upon which the cam follower 522 is mounted moves upwardly toward the base plate 438. The gage 506 passes through the gage receiving passage 444 in the base plate 438 such that the lower end face 508 of the gage 506 is raised above the upper surface 442 of the base plate 438. If the preform 100, 102 is of the proper internal diameter and is not defective, the gage 506 will extend upwardly into the threaded neck 108 of the preform 100, 102. A preform 100, which has a sufficiently large internal diameter, will not be displaced by the gage 506. However, if the internal diameter of the preform 100 is too small, the gage 506 will be unable to pass into the threaded neck 108 of the preform 100. If the internal diameter of the neck 108 of the preform 100 is smaller than the diameter of the lower end face 508 of the gage 506, the gage 506 will come into contact with the preform 100 and raise the preform 100 above the upper surface 442 of the base plate 438. If the preform 100 is displaced from the base plate 438 by the gage 506, the second testing bridge 584 will contact the preform 100 near the closed end 106 thereof and knock the preform out of the tester 400.

After the cam follower 522 has passed over the highest point of the cam 530, the cam follower 522 continues passing over the cam 530 and the gage shaft 498 moves in a downward direction and the gage 506 returns to a position wherein the upper end face 510 of the gage 506 is aligned with upper surface 442 of the base plate 438.

If the preform 100 has not been ejected from the tester by the force of gravity or by the first testing bridge or the second testing bridge, the preform 100 proceeds into the discharge outlet 404 and out of the tester 400.

Thus, the tester 400 of the present invention provides two distinct testing stations for eliminating defective preforms. The first testing station is at the first testing bridge 578. The first testing bridge 578 is located within the vacuum-off area 568. Within the vacuum-off area 568, the preform 100 is retained within the tester 400 solely by the spring retainer blade 604. There is no vacuum force retaining the preform 100 against the preform engaging surface 464 in this vacuum-off area 568. If the open end 104 or the threaded neck 108 of the preform 100 is defective, the force exerted by the spring retainer blade 604 will be insufficient to retain the preform 100 within the tester 400, that is, in contact with the preform engaging surface 464 and the upper surface 442 of the base plate 438. A defective preform 102, which has a defective open end 104 will, therefore, fall out of the tester 400. If a preform 100 is too tall or has excessive material adjacent the closed end 106, the preform will come into contact with the first testing bridge 578. Upon contacting the first testing bridge 578, the force exerted by the first testing bridge 578 will be sufficient to overcome the retaining force exerted by the spring retainer blade 604 and the first testing bridge 578 will knock a defective preform 102 out of the tester 400.

The second testing station comprises the area in which the cam follower 522 passes over the cam 530. As the cam follower 522 passes over the cam 530, the gage shaft 498 secured to the cam shaft 512 upon which the cam follower 522 is mounted moves upwardly and causes the gage 506 to pass through the gage receiving passage 444 in the base plate 438. If the internal diameter of the neck 108 of the preform 100 is sufficiently large, the gage 506 will pass into the preform 100. If the gage 506 passes into the preform 100, the preform 100 remains in contact with the upper surface 442 of the base plate 438 and the preform 100 passes under the second testing bridge 584. If, however, the internal diameter of the neck 108 of the preform 100 is too small, the gage 506 will be unable to pass into the preform 100. In this instance, the gage 506 will displace the preform 100 from contact with the base plate 438. Instead, the gage 506 will lift the preform 100 above the base plate 438 and the second testing bridge 584 will contact the closed end 106 of the preform 100. This contact with the second testing bridge 584 will knock the preform 100 out of the tester 400. If a preform 100 is not defective, the preform 100 will pass through the first testing station and the second testing station and proceed out of the tester 400 through the discharge outlet 404.

The preform handling apparatus of the present invention is useful for orienting and testing any size preform. It will be apparent to those skilled in the art that the exact dimensions of the inverter and the tester are dependent upon the size of the preforms to be tested. However, any modifications necessary to insure elimination of defective preforms of a particular size are considered to be within the scope of this invention. For example, the exact size of the gage will be dependent upon the desired internal diameter of the neck of the preform. Similarly, the distance from the preform shoulder receiving passage to the spacer in the inverter will be dependent upon the length of the body of the preform.

Although the invention has been described in considerable detail with reference to a preferred embodiment thereof, it will be apparent to those skilled in the art that the present invention can be modified without departing from the spirit and scope of the invention as described above and as defined in the appended claims.

What is claimed is:

1. Preform handling apparatus for orienting and testing a plurality of preforms, each of said preforms having an outer diameter an open end and a closed end, a threaded neck adjacent the open end, a shoulder adjacent the neck, and a body extending from the shoulder to the closed end said body having an outer diameter, the outer diameter of the preform being largest at the shoulder, said preform handling apparatus comprising:

I. a frame;

II. an orienter carried by the frame, said orienter comprising:
  A. a base driving mechanism carried by the frame;
  B. a rotatable disc carried by the base driving mechanism;
  C. a retaining wall extending substantially around the disc, said retaining wall having a first end, a second end, an inner surface facing the disc and an outer surface facing away from the disc, the retaining wall being at a distance from the disc, said distance between the retaining wall and the disc being greater than the outer diameter of the body of a preform and less than the outer diameter of the shoulder of the preform, said first end and second end of the retaining wall overlapping to form an orienter exit;

wherein a plurality of preforms received on the disc are retained thereupon by the retaining wall;

wherein as the disc rotates the preforms migrate toward the retaining wall and become oriented such that the body of the preform extends beyond the disc and the outer surface of the retaining wall, and the shoulder and neck of the preform are held adjacent the disc and the inner surface of the retaining wall;

wherein preforms oriented with the body extending beyond the disc and the outer surface of the retaining wall proceed into the orienter exit;

III. an inverter carried by the frame, said inverter being adjacent the orienter exit of the orienter and having a receiving end adapted to receive preforms from the orienter, said inverter comprising:

A. two juxtaposed vertically disposed semicircular plates, each of said plates having a straight edge, a semicircular edge and an inner surface having a groove formed therein, each of said grooves extending parallel to the semicircular edge of the plate and said grooves being aligned to form a preform shoulder receiving passage;

B. a spacer positioned between the inner surfaces of the semicircular plates, said spacer maintaining the plates in juxtaposed relation such that the distance between the inner surfaces of the plates is greater than the outer diameter of the body of the preform and less than the outer diameter of the shoulder of the preform;

wherein the receiving end of the inverter is aligned with the orienter exit of the orienter such that the preforms are fed into the inverter with the shoulder of the preform being received in the preform shoulder receiving passage and the open end of the preform being directed upwardly; and wherein the preform travels through the inverter with the shoulder of the preform traveling through the preform shoulder receiving passage and the preform exits from the inverter, said preform having been rotated 180° with the open end of the preform directed downwardly;

IV. a tester carried by the frame, said tester having an inlet for receiving said preforms and a discharge outlet through which the preforms are guided out of the tester, said preforms moving through the tester in a given direction along an arcuate path of about 270° measured from the inlet to the discharge outlet, said tester comprising:

A. a mounting post carried by the frame;
B. a main shaft carried by the mounting post, said main shaft having a vertical central axis;
C. a motor carried by the frame, said motor having a driving gear;
D. a hub subassembly carried by the mounting post comprising a driven gear in meshing engagement with the driving gear, and a hub carried by the driven gear and rotatable about the main shaft, said hub having a central hub passage through which the main shaft is received;
E. a star wheel subassembly carried by the hub and rotatable about the main shaft, said star wheel subassembly comprising:

i. a base plate having a lower surface, an upper surface and a plurality of gage receiving passages therethrough, said gage receiving passages being radially evenly spaced on a given circle;
ii. a lower star wheel having an upper surface and a lower surface, the lower surface of the lower star wheel being adjacent to the upper surface of the base plate;
iii. an upper star wheel juxtaposed from the lower star wheel and having an upper surface, a lower surface and an outer edge provided with a plurality of preform engaging surfaces, the number of preform engaging surfaces being equal to the number of gage receiving passages in the base plate, each of said preform engaging surfaces being curved, and said upper star wheel being provided with a plurality vacuum passages, each of said vacuum passages having a first opening in the upper surface of the upper star wheel and a second opening in one of the preform engaging surfaces;
iv. a star wheel spacer positioned between the upper star wheel and the lower star wheel, said star wheel spacer being adjacent the lower surface of the upper star wheel and the upper surface of the lower star wheel;

F. a plurality of gage subassemblies fixedly attached to the lower surface of the base plate and extending downwardly therefrom such that each of the gage subassemblies is aligned with one of the gage receiving passages in the base plate, each of said gage subassemblies comprising:

i. a gage housing having a cylindrical wall and a central passage therethrough, said gage housing having a roller receiving passage formed in the cylindrical wall;
ii. a gage shaft slidably received in the central passage of the gage housing, said gage shaft having a roller receiving recess formed therein;
iii. a gage carried by the gage shaft;
iv. a cam shaft fixedly secured at one end to the gage shaft, said cam shaft extending through the roller receiving recess and the roller receiving passage perpendicular to the gage shaft;
v. a roller rotatably mounted on the cam shaft, said roller having a first end positioned in the roller receiving passage and said roller having a sidewall contacting the roller receiving passage in the gage housing;
vi. a cam follower rotatably mounted on the cam shaft, said cam follower being adjacent the roller;

G. a cam carried by the mounting post, said cam being located below the star wheel subassembly and adapted to successively contact each cam follower as the star wheel subassembly and the gage subassemblies secured thereto rotate about the main shaft;

H. a vacuum subassembly carried by the main shaft above the star wheel subassembly, said vacuum subassembly comprising:

i. a retainer disc fixedly secured to the main shaft;
ii. a vacuum disc juxtaposed with the retainer disc and mounted on the hub, said vacuum disc having two vacuum channels formed therein and having two vacuum line receiving passages, one of the vacuum line receiving passages being in fluid communication with a first vacuum channel and the other of the vacuum line receiving passages being in fluid communication with a second vacuum channel, said vacuum disc having an air bleeder positioned between the first vacuum channel and the second vacuum channel;

wherein vacuum lines are received in the vacuum line receiving passages thereby creating a vacuum through the first and second vacuum channels and producing two vacuum-on areas of the arcuate path through the tester;

wherein a vacuum-off area of the arcuate path is located in the area between the first vacuum channel and the second vacuum channel;

wherein in each of the vacuum-on areas the preforms are retained by vacuum against the preform engaging surfaces of the upper star wheel;

I. a bridge subassembly carried by the main shaft above the vacuum subassembly, said bridge subassembly comprising:
  i. a top plate encircling the main shaft and fixedly secured thereto;
  ii. a first testing bridge carried by the top plate, said first testing bridge extending over the star wheel subassembly such that the first testing bridge is above the vacuum-off area of the arcuate path;
  iii. a second testing bridge carried by the top plate, said second testing bridge extending over the star wheel subassembly such that the second testing bridge is above the cam.

2. Preform handling apparatus of claim 1 wherein the rotatable disc of the orienter has an upper surface which lies in a plane which is vertically displaced about 10° from horizontal.

3. Preform handling apparatus of claim 1 wherein the orienter further comprises a flexible guide carried by the retaining wall and extending over the disc from the inner surface of the retaining wall.

4. Preform handling apparatus of claim 1 wherein the inverter further comprises a support rail carried by the spacer, said support rail extending parallel to the semicircular edges of the semicircular plates and circumscribing an arc of less than 180°.

5. Preform handling apparatus of claim 4 wherein the distance from the support rail to the preform shoulder receiving passage of the inverter is slightly less than the distance from the shoulder to the closed end of the preform.

6. Preform handling apparatus of claim 1 wherein the gage is frusto-cronical with a larger diameter lower end face and a smaller diameter upper end face.

7. Preform handling apparatus of claim 1 wherein the cam extends below the star wheel subassembly from about 120° to 210° along the arcuate path in the tester.

8. Preform handling apparatus of claim 1 wherein said first vacuum-on area extends from the inlet to about 70° along the arcuate path and said second vacuum-on area extends from about 110° to about 250° along the arcuate path.

9. Preform handling apparatus of claim 1 wherein the vacuum-off area extends from about 70° to about 110° along the arcuate path.

10. Preform handling apparatus of claim 1 further comprising a spring retainer subassembly carried by the top plate of the bridge assembly, said spring retainer subassembly comprising a post extending downwardly from the top plate, a spring retainer attached to the post, and a spring retainer blade attached to the spring retainer and extending perpendicular to the post, wherein the spring retainer blade is adapted to contact the body of the preform as the preform travels through the vacuum-off area of the arcuate path through the tester.

11. Preform handling apparatus of claim 1 wherein a conveyor is positioned between the inverter and the tester.

12. Preform handling apparatus of claim 1 wherein the tester is adjacent the inverter.

13. Preform handling apparatus for orienting a plurality of preforms, each of said preforms having an outer diameter, an open end and a closed end, a threaded neck adjacent the open end, a shoulder adjacent the neck, and a body extending from the shoulder to the closed end and having an outer diameter, the outer diameter of the preform being largest at the shoulder, said preform handling apparatus being an inverter, said inverter comprising:

I. a frame;
II. two juxtaposed semicircular plates carried by the frame, each of said plates having a straight edge, a semicircular edge and an inner surface having a groove formed therein, each of said grooves extending parallel to the semicircular edge of the plate and said grooves being aligned to form a preform shoulder receiving passage;
III. a spacer positioned between the inner surfaces of the semicircular plates, said spacer maintaining the plates in juxtaposed relation such that the distance between the inner surfaces of the plates is greater than the outer diameter of the body of the preform and less than the outer diameter of the shoulder of the preform;
IV. a support rail carried by the spacer, said support rail extending parallel to the semicircular edges of the semicircular plates and circumscribing an arc of less than 180°, said support rail being at a distance from the preform shoulder receiving passage which distance is slightly less than the distance from the shoulder to the closed end of the preform;

wherein preforms fed into the inverter are received in the inverter such that the shoulder of the preform is received in the preform shoulder receiving passage and the open end of the preform is directed upwardly; and wherein the preform travels through the inverter such that the shoulder of the preform travels through the preform shoulder receiving passage and the preform exits from the inverter having been rotated 180° with the open end of the preform directed downwardly.

14. Preform handling apparatus for testing a plurality of preforms, each of said preforms having an outer diameter an open end and a closed end, a threaded neck adjacent the open end, a shoulder adjacent the neck, and a body extending from the shoulder to the closed end said body having an outer diameter, the outer diameter of the preform being largest at the shoulder, said preform handling apparatus being a tester, said tester having an inlet for receiving preforms and a discharge outlet through which the preforms are guided out of the tester, said preforms moving through the tester in a given direction along an arcuate path of about 270° measured from the inlet to the discharge outlet, said tester comprising:

I. a frame;
II. a mounting post carried by the frame;
III. a main shaft carried by the mounting post, said main shaft having a vertical central axis;

IV. a motor carried by the frame, said motor having a driving gear;
V. a hub subassembly carried by the mounting post comprising a driven gear in meshing engagement with the driving gear, and a hub carried by the driven gear and rotatable about the main shaft, said hub having a central hub passage through which the main shaft is received;
VI. a star wheel subassembly carried by the hub and rotatable about the main shaft, said star wheel subassembly comprising:
   A. a base plate having a lower surface, an upper surface and a plurality of gage receiving passages therethrough, said gage receiving passages being radially evenly spaced on a given circle;
   B. a lower star wheel having an upper surface and a lower surface, the lower surface of the lower star wheel being adjacent to the upper surface of the base plate;
   C. an upper star wheel juxtaposed from the lower star wheel and having an upper surface, a lower surface and an outer edge provided with a plurality of preform engaging surfaces, the number of preform engaging surfaces being equal to the number of gage receiving passages in the base plate, each of said preform engaging surfaces being curved, and said upper star wheel being provided with a plurality vacuum passages, each of said vacuum passages having a first opening in the upper surface of the upper star wheel and a second opening in one of the preform engaging surfaces;
   D. a star wheel spacer positioned between the upper star wheel and the lower star wheel, said star wheel spacer being adjacent the lower surface of the upper star wheel and the upper surface of the lower star wheel;
VII. a plurality of gage subassemblies fixedly attached to the lower surface of the base plate and extending downwardly therefrom such that each of the gage subassemblies is aligned with one of the gage receiving passages in the base plate, each of said gage subassemblies comprising:
   A. a gage housing having a cylindrical wall and a central passage therethrough, said gage housing having a roller receiving passage formed in the cylindrical wall;
   B. a gage shaft slidably received in the central passage of the gage housing, said gage shaft having a roller receiving recess formed therein;
   C. a gage carried by the gage shaft;
   D. a cam shaft fixedly secured at one end to the gage shaft, said cam shaft extending through the roller receiving recess and the roller receiving passage perpendicular to the gage shaft;
   E. a roller rotatably mounted on the cam shaft, said roller having a first end positioned in the roller receiving passage and said roller having a sidewall contacting the roller receiving passage in the gage housing;
   F. a cam follower rotatably mounted on the cam shaft, said cam follower being adjacent the roller;
VIII. a cam carried by the mounting post, said cam being located below the star wheel subassembly and adapted to successively contact each cam follower as the star wheel subassembly and the gage subassemblies secured thereto rotate about the main shaft;
IX. a vacuum subassembly carried by the main shaft above the star wheel subassembly, said vacuum subassembly comprising:
   A. a retainer disc fixedly secured to the main shaft;
   B. a vacuum disc juxtaposed with the retainer disc and mounted on the hub, said vacuum disc having two vacuum channels formed therein and having two vacuum line receiving passages, one of the vacuum line receiving passages being in fluid communication with a first vacuum channel and the other of the vacuum line receiving passages being in fluid communication with a second vacuum channel, said vacuum disc having an air bleeder positioned between the first vacuum channel and the second vacuum channel;
   wherein vacuum lines are received in the vacuum line receiving passages thereby creating a vacuum through the first and second vacuum channels and producing two vacuum-on areas of the arcuate path through the tester;
   wherein a vacuum-off area of the arcuate path is located in the area between the first vacuum channel and the second vacuum channel;
   wherein in each of the vacuum-on areas the preforms are retained by vacuum against the preform engaging surfaces of the upper star wheel;
X. a bridge subassembly carried by the main shaft above the vacuum subassembly, said bridge subassembly comprising:
   A. a top plate encircling the main shaft and fixedly secured thereto;
   B. a first testing bridge carried by the top plate, said first testing bridge extending over the star wheel subassembly such that the first testing bridge is above the vacuum-off area of the arcuate path;
   C. a second testing bridge carried by the top plate, said second testing bridge extending over the star wheel subassembly such that the second testing bridge is above the cam.

15. Preform handling apparatus 10 for orienting and testing a plurality of preforms 100,102, each of said preforms 100,102 having an open end 104 and a closed end 106, a threaded neck 108 adjacent the open end 104, a shoulder 110 adjacent the threaded neck 108, and a body 112 extending from the shoulder 110 to the closed end 106, the outer diameter of the preform 100 being largest at the shoulder 110, said preform handling apparatus 10 comprising:
I. a frame 12;
II. an orienter 200 carried by the frame 12, said orienter 200 comprising:
   A. a base driving mechanism 202 carried by the frame 12;
   B. a rotatable circular disc 204 carried by the base driving mechanism 202, said disc 204 having an upper surface 206 which lies in a plane (208) which is vertically displaced about 10° from horizontal said disc 204 having an upraised portion 210 which is 10° above horizontal and a lowered portion 212 which is 10° below horizontal;
   C. a plurality of wall supports 214,216 carried by the frame 12;
   D. a retaining wall 218 carried by the wall supports 214,216, said retaining wall 218 extending substantially around the circumference of the disc 204, said retaining wall 218 having a first end 220, a second end 222, an upper edge 224 and a lower edge 226 extending from the first end 220 to the second end 222, an inner surface 228 facing the disc 204 and an outer surface 230 facing away from the disc 204, the lower edge 226 of the retaining wall 218 being at a distance from the upper surface 206 of the disc 204, the distance between the lower edge 226 of the retaining wall 218 and the upper surface 206 of the disc 204 being greater than the outer diameter of the body 112 of a preform 100 and less than the outer diameter of the shoulder 110 of the preform 100, said first end 220 and second end 222 of the retaining wall 218 overlapping such that a first end portion 232 of the outer surface 230 adjacent the first end 220 is juxtaposed at a distance from a second end portion 234 of the inner surface 228 adjacent the second end 222 thereby forming an orienter exit 236, the distance between the first end portion 232 and the second end portion 234 in the orienter exit 236 being greater than the outer diameter of the body 112 of the preform 100 and less than the outer diameter of the shoulder 110 of the preform 100, said orienter exit 236 being located adjacent the upraised portion 210 of the disc 204;

E. a flexible guide 238 carried by the retaining wall 218 and extending over the disc 204 from the inner surface 228 of the retaining wall 218;

wherein, a plurality of preforms 100,102 are received on the disc 204 and retained thereupon by the retaining wall 218;

wherein as the disc 204 rotates the preforms 100,102 migrate toward the retaining wall 218 and become oriented such that the body 112 of the preform 100 extends beyond the disc 204 and the outer surface 230 of the retaining wall 218, and the shoulder 110 and neck 108 of the preform 100 are held adjacent the inner surface 228 of the retaining wall 218 and the upper surface 206 of the disc 204; and wherein preforms 100,102 oriented with the body 112 extending beyond the disc 204 and the outer surface 230 of the retaining wall 218 pass under the flexible guide 238 and proceed into the orienter exit 236; and wherein the flexible guide 238 contacts the preforms 100,102 located entirely on the disc 204 and directs the preforms 100,102 toward the retaining wall 218 and away from the orienter exit 236;

III. an inverter 300 carried by the frame 12, said inverter 300 being adjacent the orienter exit 236 of the orienter 200 and adapted to receive preforms 100,102 from the orienter 200, said inverter 300 comprising:

A. two semicircular plates 302,304, each of said plates 302,304 having a straight edge 306,308, a semicircular edge 310,312, an inner surface 314,316 and an outer surface 318,320, the inner surfaces 314,316 of the plates 302,304 being juxtaposed, the inner surface 314,316 of each plate 302,304 having a groove 322,324 formed therein, said grooves 322,324 extending parallel to the semicircular edges 310,312 of the plates 302,304 and said grooves 322,324 being located at a distance from the semicircular edges 310,312 which is greater than the distance from the shoulder 110 to the open end 104 of the preform 100, the grooves 322,324 in the plates 302,304 being aligned to form a preform shoulder receiving passage 326;

B. a spacer 328 positioned between the inner surfaces 314,316 of the plates 302,304, said spacer 328 maintaining the plates 302,304 in juxtaposed relation such that the distance between the inner surfaces 314,316 of the plates 302,304 is greater than the outer diameter of the body 112 of the preform 100 and less than the outer diameter of the shoulder 110 of the preform 100, said spacer 328 being semicircular and having a straight edge 330 and a semicircular edge 332, the straight edge 330 of the spacer 328 being centrally disposed between the straight edges 306,308 of the plates 302,304 and the distance from the preform shoulder receiving passage 326 to the semicircular edge 332 of the spacer 328 being greater than the distance from the shoulder 110 to the closed end 106 of the preform 100;

C. a support rail 334 carried by the spacer 328, said support rail 334 extending parallel to the semicircular edges 310,312 of the plates 302,304 and circumscribing an arc of less than 180°, said support rail 334 being located at a distance from the preform shoulder receiving passage 326 of slightly less than the distance from the shoulder 110 to the closed end 106 of the preform 100;

wherein an upper end 336 of the inverter 300 is aligned with the orienter exit 236 such that the preforms 100,102 are fed into the inverter 300 with the shoulder 110 of the preform 100 received in the preform shoulder receiving passage 326, the closed end 106 of the preform 100 contacting the support rail 334 and the open end 104 of the preform 100 directed upwardly; and wherein the preform 100 falls through the inverter 300 with the shoulder 110 of the preform 100 travelling through the preform shoulder receiving passage 326 and the closed end 106 of the preform 100 maintaining contact with the support rail 334; and wherein the preform 100 exits from the inverter 300 at a lower end 338 of the inverter 300, said lower end 338 of the inverter 300 being diametrically opposite and below the the orienter exit 236 and the upper end 336 of the inverter 300, said preform 100 having been rotated 180° such that the preform 100 exits the lower end 338 of the inverter 300 with the open end 104 of the preform 100 directed downwardly;

IV. a tester 400 carried by the frame 12, said tester 400 having an inlet 402 for receiving inverted preforms 100,102 from the inverter 300 and a discharge outlet 404 through which the preforms 100,102 are guided out of the tester 400, said preforms 100, 102 moving through the tester 400 in a given direction along an arcuate path of about 270° measured from the inlet 402 to the discharge outlet 404, said tester 400 comprising:

A. a mounting post 406 carried by the frame 12;

B. a main shaft 408 carried by the mounting post 406, said main shaft 408 having a vertical central axis 410;

C. a motor 412 carried by the frame 12, said motor 412 having a driving gear 414;

D. a hub subassembly 416 carried by the mounting post 406, comprising:

i. a driven gear 418 encircling the mounting post 406, said driven gear 418 being in meshing engagement with the driving gear 414;

ii. a hub 420 carried by the driven gear 418 and rotatable about the main shaft 408, said hub 420 having a central passage 422 through which the main shaft 408 is received, the central passage 422 of the hub 420 having an axis 424 coincidental with the central axis 410 of the main shaft 408, said hub 420 having an upper portion 426, a lower portion 428 adjacent the driven gear 414, and a hub shoulder 430 formed between the upper portion 426 and the lower portion 428 of the hub 420, said lower portion 428 having a larger diameter than the upper portion 426;

E. a star wheel subassembly 432 carried by the hub 420 and rotatable about the main shaft 408, said star wheel subassembly 432 having a central hub-receiving passage 434 therethrough with an axis 436 coincidental with the axis 424 of the central passage 422 of the hub 420, said star wheel subassembly 432 comprising:

i. a base plate 438 having a lower surface 440 and an upper surface 442, the lower surface 440 of said base plate 438 being adjacent the hub shoulder 430, said base plate 438 having a plurality of gage receiving passages 444,446 therethrough said gage receiving passages 444,446 being radially evenly spaced on a given circle which has a center on the axis 436 of the star wheel subassembly 432, each of said gage receiving passages 444,446 having a substantially circular cross-section with a diameter greater than the internal diameter of the open end 104 and smaller than the external diameter of the threaded neck 108 of the preform 100, each of said gage receiving passages 444 having a central gage passage axis 448;

ii. a lower star wheel 450 having an upper surface 452 and a lower surface 454, the lower surface 454 of the lower star wheel 450 being adjacent to the upper surface 442 of the base plate 438;

iii. an upper star wheel 456 juxtaposed from the lower star wheel 450 and having an upper surface 458, a lower surface 460 and an outer edge 462 provided with a plurality of preform engaging surfaces 464,466, the number of preform engaging surfaces 464,466 being equal to the number of gage receiving passages 444,446 in the base plate 438, each of said preform engaging surfaces 464,466 being curved having a curve axis 468 coincidental with the axis 448 of one of the gage receiving passages 444,446, and said upper star wheel 456 being provided with a plurality of vacuum passages 470,472, each of said vacuum passages 470, 472 having a first opening 474 in the upper surface 458 of the upper star wheel 456 and a second opening 476 in one of the preform engaging surfaces 464,466;

iv. a star wheel spacer 482 positioned between the upper star wheel 456 and the lower star wheel 450, said star wheel spacer 482 being adjacent the lower surface 460 of the upper star wheel 456 and the upper surface 452 of the lower star wheel 450;

F. a plurality of gage subassemblies 484,486 fixedly attached to the lower surface 440 of the base plate 438 and extending downwardly therefrom such that each of said gage subassemblies 484, 486 is aligned with one of the gage receiving passages 444,446 in the base plate 438, each of said gage subassemblies 484,486 comprising:

i. a gage housing 488 having a cylindrical wall 490 and a central passage 492 therethrough with an axis 494 coincidental with the central gage passage axis 448 of the gage receiving passage 444 with which the gage subassembly 484 is aligned, said gage housing 488 having an inner diameter equal to the diameter of the gage receiving passage 444 in the base plate 438 and said gage housing 488 having a roller receiving passage 496 formed in the cylindrical wall 490;

ii. a gage shaft 498 slidably received in the central passage 492 of the gage housing 488, said gage shaft 498 having a roller receiving recess 500 formed therein and said gage shaft 498 having a central axis 502 coincidental with the axis 494 of the gage housing 488;

iii. a gage pin 504 carried by the gage shaft 498;

iv. a gage 506 carried by the gage pin 504, said gage 506 being frusto-conical with a larger diameter lower end face 508 and a smaller diameter upper end face 510, the diameter of the lower end face 508 being smaller than the diameter of the gage receiving passage 444 in the base plate 438;

v. a cam shaft 512 fixedly secured at one end to the gage shaft 498, said cam shaft 512 extending through the roller receiving recess 500 and the roller receiving passage 496 perpendicular to the gage shaft 498;

vi. a roller 514 rotatably mounted on the cam shaft 512, said roller 514 having a first end 516, a second end 518 and a sidewall 520 therebetween, the first end 516 of the roller 514 being positioned in the roller receiving recess 500 of the gage shaft 498 and the sidewall 520 of the roller 514 contacting the roller receiving passage 496 in the gage housing 488;

vii. a cam follower 522 rotatably mounted on the cam shaft 512, said cam follower 522 having a first end 524, a second end 526 and a sidewall 528 therebetween, the first end 524 of the cam follower 522 being adjacent the second end 518 of the roller 514;

G. a cam 530 carried by the mounting post 406, said cam 530 being located below the star wheel subassembly 432 and adapted to successively contact the sidewall 528 of each cam follower 522 as the star wheel subassembly 432 and the gage subassemblies 484,486 secured thereto rotate about the main shaft 408, said cam 530 extending below the star wheel subassembly 432 from about 120° to 210° along the path of movement of the preforms 100,102 through the tester 400;

wherein as the star wheel subassembly 432 rotates about the main shaft 408, each cam follower 522 successively contacts the cam 530 whereby the gage shaft 498 secured to the cam shaft 512 upon which the cam follower 522 is mounted moves upwardly toward the base plate 438 and the gage 506 passes through the gage receiving passage 444 in the base plate 438 such that the lower end face 508 of the gage 506 is raised above the upper surface 442 of the base plate 438; and wherein as the cam follower 522 continues passing over the cam 530, the gage shaft 498 moves in a downward direction and the gage 506 returns to a position wherein the upper end face 510 of the gage 506 is aligned with the upper surface 442 of the base plate 438;

H. a vacuum subassembly 532 carried by the main shaft 408 above the star wheel subassembly 432, said vacuum subassembly 532 comprising:
  i. a retainer disc 534 fixedly secured to the main shaft 408;
  ii. a vacuum disc 536 juxtaposed with the retainer disc 534 and mounted on the hub 420, said vacuum disc 536 having an upper surface 538 facing the retainer disc 532, a lower surface 540 and an outer edge 542 therebetween, said lower surface 540 of the vacuum disc 536 having an edge portion 544 adjacent the outer edge 542, said edge portion 544 having a thickness greater than the thickness of a center portion 546 of the lower surface 540 of the vacuum disc 536, said edge portion 544 of the vacuum disc 536 being in contact with the upper surface 458 of the upper star wheel 456 and having two vacuum channels 548,550 formed therein, a first vacuum channel 548 being aligned in fluid communication with the first opening 474 of the vacuum passages 470,472 in the upper star wheel 456 from the inlet 402 of the tester 400 to about 70° along the arcuate path of movement and a second vacuum channel 550 being aligned in fluid communication with the first openings 474 of the vacuum passages 470,472 in the upper star wheel 456 from about 110° to 250° along the arcuate path, said vacuum disc 536 having two vacuum line receiving passages 552,554 in the upper surface 538 thereof, one of the vacuum line receiving passages 552 being in fluid communication with the first vacuum channel 548 and the other of the vacuum line receiving passages 554 being in fluid communication with the second vacuum channel 550, and said vacuum disc 536 having an air bleeder 606 positioned between the first vacuum channel 548 and the second vacuum channel 550, said air bleeder 606 having a first opening in the upper surface 538 of the vacuum disc 536 and a second opening in the lower surface 540 of the vacuum disc 536;
  iii. a plurality of springs 556,558, each of said springs 556,558 having a first end 560 secured to the retainer disc 534 and a second end 562 secured to the vacuum disc 536;
    wherein vacuum lines are received in the vacuum line receiving passages 552,554 in the upper surface 538 of the vacuum disc 536 thereby creating a vacuum through the first 548 and second 550 vacuum channels and producing two vacuum-on areas 564,566 in the tester, a first vacuum-on area 564 extending from the inlet to about 70° along the arcuate path and a second vacuum-on area 566 extending from about 110° to about 250° along the arcuate path;
    wherein a vacuum-off area 568 of the arcuate path extends from about 70° to about 110°, said vacuum-off area 568 being the area between the first vacuum channel and the second vacuum channel;
    wherein in each of said vacuum-on areas 564, 566 the preforms 100,102 are retained by vacuum against the preform engaging surfaces 464,466 of the upper star wheel 456;
I. a bridge subassembly 570 carried by the main shaft 408 above the vacuum subassembly 532, said bridge subassembly 570 comprising:
  i. a top plate 572 encircling the main shaft 408 and fixedly secured thereto, said top plate 572 having an upper surface 574 and a lower surface 576;
  ii. a first testing bridge 578 carried by the top plate 572 and having a lower edge 580 and an upper edge 582, said first testing bridge 578 extending radially along the lower surface 576 of the top plate 572 such than the upper edge 582 of the first testing bridge 578 is adjacent the lower surface 576 of the top plate 572, said first testing bridge 578 extending over the vacuum subassembly 532 such that the first testing bridge 578 is above the vacuum-off area 568 of the arcuate path;
  iii. a second testing bridge 584 carried by the top plate 572 and having a lower edge 586 and an upper edge 588, said second testing bridge 584 extending radially along the lower surface 576 of the top plate 572 such that the upper edge 588 of the second testing bridge 584 is adjacent the lower surface 576 of the top plate 572, said second testing bridge 584 extending over the star wheel subassembly 432 such that the second testing bridge 582 is above the cam 530;
  iv. a first bridge spring 590 fixedly secured to the top plate 572 and to the first testing bridge 578;
  v. a second bridge spring 592 fixedly secured to the top plate 572 and to the second testing bridge 584;
    wherein the distance from the lower edge 580 of the first testing bridge 578 to the upper surface 442 of the base plate 438 is slightly greater than the distance from the open end 104 to the closed end 106 of the preform 100; and;
    wherein the distance from the lower edge 586 of the second testing bridge 584 to the upper surface 442 of the base plate 438 is slightly greater than the distance from the open end 104 to the closed end 106 of the preform 100;
J. a spring retainer subassembly 594 carried by the top plate 572, said spring retainer subassembly 594 comprising:
  i. a post 596 having an upper end 598 and a lower end 600, the upper end 598 of the post 596 being fixedly secured to the top plate 572 such that said post 596 extends downwardly from the lower surface 576 of the top plate 572;
  ii. a spring retainer 602 attached to the lower end 600 of the post 596;
  iii. a spring retainer blade 604 attached at one end to the spring retainer 602, said spring retainer blade 604 extending perpendicular to the post 596;
    wherein said spring retainer blade 604 is adapted to contact the body 112 of the preform 100 as the preform 100 travels through the vacuum-off area 568 of the arcuate path through the tester 400.

* * * * *